(12) United States Patent
Kageishi et al.

(10) Patent No.: US 6,274,671 B1
(45) Date of Patent: Aug. 14, 2001

(54) RESIN COMPOSITIONS FOR COATINGS

(75) Inventors: Ichiji Kageishi; Yoshitaka Osanai; Yumi Ando, all of Chiba (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 09/446,164

(22) PCT Filed: Apr. 19, 1999

(86) PCT No.: PCT/JP99/02076
§ 371 Date: Dec. 17, 1999
§ 102(e) Date: Dec. 17, 1999

(87) PCT Pub. No.: WO99/54417
PCT Pub. Date: Oct. 28, 1999

(30) Foreign Application Priority Data

Apr. 20, 1998 (JP) .................................................. 10-109178
Jan. 13, 1999 (JP) .................................................. 11-006889

(51) Int. Cl.$^7$ ...................................................... C08G 8/00
(52) U.S. Cl. ........................................... 525/101; 525/100
(58) Field of Search ...................................... 525/100, 101

(56) References Cited

U.S. PATENT DOCUMENTS

| | | | |
|---|---|---|---|
| 4,496,611 | 1/1985 | Kawakubo et al. . | |
| 5,026,793 | * 6/1991 | Nakai et al. | 525/476 |
| 5,492,968 | * 2/1996 | Nakai et al. | 525/101 |
| 5,525,673 | * 6/1996 | Nakahata et al. | 525/104 |

FOREIGN PATENT DOCUMENTS 9-132752   5/1997   (JP) .

* cited by examiner

*Primary Examiner*—Margaret G. Moore
(74) *Attorney, Agent, or Firm*—Schnader Harrison Segal & Lewis LLP

(57) ABSTRACT

This invention relates to a coating resin composition including an acrylic resin (A) having a hydroxyl group and an alicyclic epoxy group attached to side chains thereof, an alicyclic epoxy resin (B) having an epoxy equivalent weight of 100–1000, an organoalkoxy silane compound (C) having a glycidyl group and a hydrolyzable alkoxy silane group contained in one molecule thereof, and an aluminum chelate compound (D). The composition is stably storable, highly curable at low temperature (80° C. or below) and capable of producing a highly weatherable coating, and is useful particularly as a coating resin composition of a one-pack type and a coating derivable therefrom. The composition also exhibits various superior coating performance characteristics (bonding, appearance, weathering resistance, chemical resistance, solvent resistance and the like) in a well-balanced state.

4 Claims, 1 Drawing Sheet

RESIN COMPOSITIONS FOR COATINGS

TECHNICAL FIELD

This invention relates to a resin composition for coating use which is highly curable even at low temperature (at 80° C. or lower).

BACKGROUND ART

Heretofore, a demand has been made for coating resins of a one-pack type which could be cured sufficiently at low temperature (at 80° C. or lower). To this end, some techniques have been proposed as described below, but none of them can provide a good balance of storage stability, curing performance and other performance characteristics required for a variety of coating compositions.

More specifically, with regard to a conventional curing system in which an acrylic polyol configured to have a hydroxyl group at its molecular side chains is cured with a melamine resin or a blocked isocyanate compound, or in which an epoxy resin is cured with the use of a potential catalyst (a curing agent), curing should be performed at 120° C. to make the system effective. Lower curing temperatures than 120° C. fail to give sufficient crosslink density with consequent unfeasibility of desirable film properties and the like. Curing at a lower temperature than the above counterpart needs multiple packs, leaving a number of problems at work. Polyisocyanate is satisfactorily curable, but is rather poisonous due to the nature of isocyanate.

Relatively recently, curing systems have been evolved and disclosed in which a metal chelate compound such as aluminum chelate compounds is added to an acrylic resin structured to have at their side chains an alkoxy silane group and an epoxy group (Japanese Examined Patent Publications Nos. 55-41712, 60-50223, 60-50225, 61-23816 and 61-23817 and Japanese Unexamined Patent Publications Nos. 64-75502, 4-139281, 1-259071 and 1-287177). However, because the acrylic resin has an alkoxy silane group (or a hydrolyzed silanol group) attached to the side chains, such a curing system brings about something unnatural in configuration and hence results in poor storage stability. In industrial sectors (typified as in-situ coating at construction sites), the curing system is used as a two-pack type when cured at a low temperatures of 80° C. or below. In the case of use as a one-pack type, the curing system is not sufficiently curable at a low temperature of 80° C. or below.

Moreover, since the acrylic resin is structured to have an alkoxy silane group at the side chains, the foregoing curing system poses the problem that it tends to cause seeding (cohesion and the like) on contact with a pigment, and the resultant film tends to dry and cure preferentially only on its surface upon completion of the coating (consequently, a solvent remains in the film longer and hence makes desirable film properties unattainable). Still another problem is that when the curing system is coated at high temperature or in a low temperature and dry atmosphere, the film becomes shrunk on the surface.

In addition, in Japanese Unexamined Patent Publication No. 62-119276, there is disclosed a primer composition constituted of an acrylic resin structured to have attached to its side chains an epoxy group and a hydroxyl group, a bisphenol A epoxy resin, a silane compound structured to have attached to its side chains an amino group or a glycidyl group, and an alkyl chelate compound. Japanese Unexamined Patent Publication No. 2-73825 discloses a resin composition containing (1) a hydroxyl group-bonded acrylic resin, an alicyclic epoxy resin, a silane compound and a metal chelate compound such as an aluminum chelate compound or the like, or (2) an (alicyclic) epoxy resin, a hydroxyl group-bonded acrylic resin, a silane compound and a metal chelate compound such as an aluminum chelate compound or the like, and a method of curing such resin composition. However, the last-mentioned publication does not in any way disclose that both the acrylic resin and the epoxy resin should contain an alicyclic epoxy group, nor does it disclose using a glycidyl group-containing silane compound together with both of the resins. Japanese Unexamined Patent Publication No. 10-87942 discloses a one-pack composition containing an acrylic resin having at its side chains a hydroxyl group and an epoxy group, a variety of silane compounds, a curing catalyst such as an aluminum chelate compound or the like, and an organic solvent. In this technique, however, the composition fails to cure sufficiently at a low temperature of 80° C. or below and besides suffers from film shrinkage to an extreme extent. Thus, the technique leaves much to be desired in order to obtain rust proofness, bonding performance, other coating performance characteristics and film appearance with a good balance and at a high level.

DISCLOSURE OF THE INVENTION

An object of the present invention is, while resolving the above problems of the conventional art, to provide a coating resin composition which is stably storable, highly curable at low temperature (at 80° C. or below) and highly capable of producing a weatherable coating, particularly a one-pack coating resin composition and a coating derivable therefrom. Furthermore, an object of the present invention is to provide a coating resin composition which exhibits, in a well-balanced state, various superior performance characteristics (bonding, appearance, weather resistance, chemical resistance, solvent resistance and the like) required for such a coating composition.

More specifically, according to the present invention, there is provided a coating resin composition comprising an acrylic resin(A) having a hydroxyl group and an alicyclic epoxy group attached to side chains thereof, an alicyclic epoxy resin (B) having an epoxy equivalent weight of 100–1000, an organoalkoxy silane compound (C) having an glycidyl group and a hydrolyzable alkoxy silane group contained to one molecule thereof, and an aluminum chelate compound (D).

BEST MODE OF IMPLEMENTING THE INVENTION

Figure 1:
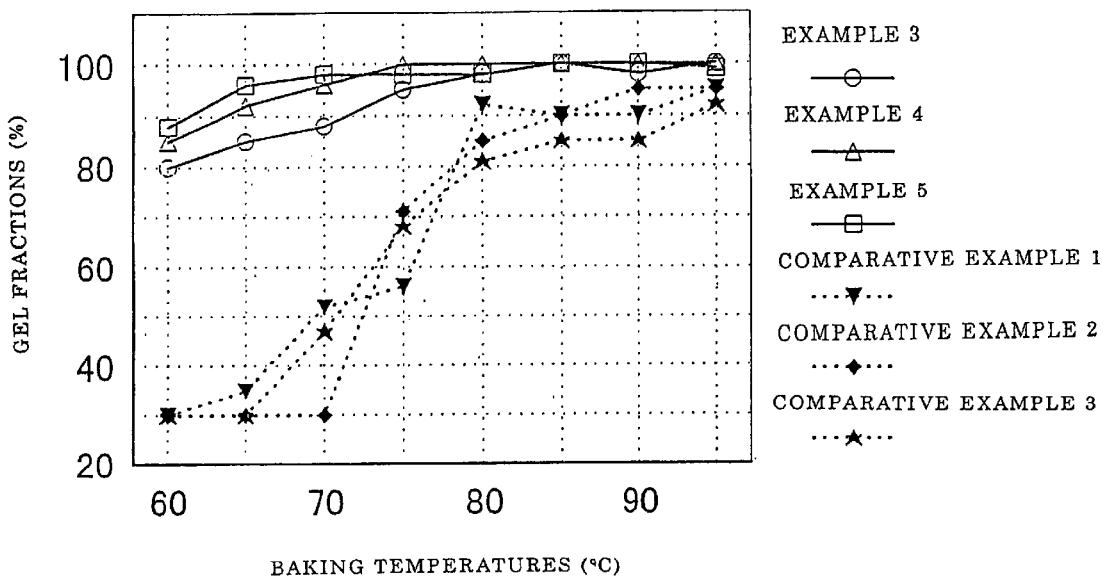
FIG. 1 shows the results obtained in Example 6.

The acrylic resin (A) according to the present invention, which is structured to have a hydroxyl group and an alicyclic epoxy group attached to its side chains, is derivable by copolymerizing a hydroxyl group-containing unsaturated monomer and an alicyclic epoxy group-containing unsaturated monomer when such acrylic resin is produced.

The hydroxyl group-containing unsaturated monomer includes 2-hydroxyethyl acrylate, 2-hydroxypropyl acrylate, 4-hydroxybutyl acrylate, mono-acrylates of 1,4-dimethylol cyclohexane, 2-hydroxyethyl methacrylate, 2-hydroxypropyl methacrylate, 4-hydroxybutyl methacrylate, mono-methacrylates of 1,4-dimethylol cyclohexane, adducts of hydroxyalkyl esters of acrylic acid or methacrylic acid having 2–8 carbon atoms and lactones such as ε-caprolactone, γ-valerolactone or the like, and mono-acrylates or mono-methacrylates of polyalkylene glycols (where the alkylene group has 1–4 carbon atoms). These monomers may be used singly, or two or more monomers may be used in admixture.

Among the above monomers, there are preferred those capable of yielding homopolymers with a glass transition temperature (Tg) of lower than 0° C. Lower Tg than 0° C. tends to improve curing of the resultant coating, thus making it possible to formulate a hydroxyl group-containing unsaturated monomer in a small amount. This leads to reduced hydroxyl group which would remain unreacted, contributing to improved resistance to water and to chemicals such as alcohols.

Hydroxyl group-containing unsaturated monomers that can give Tg of lower than 0° C. include 2-hydroxyethyl acrylate (Tg of homopolymer=−15° C.), 2-hydroxypropyl acrylate (Tg=−45° C.), 4-hydroxybutyl acrylate (Tg=−80° C.), and adducts (Tg=−5−−60° C.) of hydroxyalkyl esters of acrylic acid or methacrylic acid having 2–8 carbon atoms and lactones such as ε-caprolactone, γ-valerolactone or the like. These monomers may be used alone, or two or more monomers may be used together. Lower Tg than −30° C. (for example, when 4-hydroxybutyl acrylate (Tg=−80° C.) is copolymerized) is recommended as the finished film appearance (glossiness, sharpness and the like) is improved.

Those monomers are copolymerized such that the acrylic resins preferably have a hydroxyl number of 0.5–80 mg KOH, more preferably 5–50 mg KOH. Smaller hydroxyl numbers than 0.5 mg KOH cause delayed curing, though slightly, and hence impaired resistance to chemicals and to weathering. When the hydroxyl number exceeds 80 mg KOH, the finished film becomes sharply shrunk when formed with as large a thickness as of about 100 μm in a low temperature dry atmosphere, failing to provide aesthetically coated articles.

Alicyclic epoxy group-containing unsaturated monomers include unsaturated monomers having an oxirane group attached directly to a cycloalkyl group as in 3,4-epoxycyclohexylmethyl acrylate, 3,4-epoxycyclohexylmethyl methacrylate or the like. These alicyclic epoxy group-containing unsaturated monomers may be used alone, or two or more monomers may be used in combination.

The alicyclic epoxy group-containing unsaturated monomer is preferably incorporated in the acrylic resin (A) by copolymerization in an amount of 1–30% by weight, more preferably 2–20% by weight. Less than 1% by weight fails to attain sufficient curing at low temperature with consequent decline in bonding performance, water resistance and chemical resistance. More than 30% by weight is liable to deteriorate storage stability at a high temperature of 50° C. or above and to make the finished film shrinkable.

According to the present invention, another unsaturated monomer may be useful which is copolymerizable in nature but different from the hydroxyl group-containing unsaturated monomer and also from the alicyclic epoxy group-containing unsaturated monomer.

The above another unsaturated monomer includes alkyl esters of (meth)acrylic acid having 1–18 carbon atoms such as methyl acrylate, ethyl acrylate, n-butyl acrylate, t-butyl acrylate, iso-butyl acrylate, propyl acrylate, cyclohexyl acrylate, 2-ethylhexyl acrylate, lauryl acrylate, methyl methacrylate, ethyl methacrylate, n-butyl methacrylate, t-butyl methacrylate, iso-butyl methacrylate, propyl methacrylate, cyclohexyl methacrylate, 2-ethylhexyl methacrylate, lauryl methacrylate, stearyl methacrylate and the like. Styrene, vinyl acetate and the like are also useful which are of an unsaturated and copolymerizable character. They may be used alone, or two or more monomers may be used in combination.

As another preferred form of the acrylic resin (A) used in the present invention, there may be cited an acrylic resin (A) in which a benzotriazole-based polymerizable unsaturated double bond-containing ultraviolet absorber (G) has been copolymerized in an amount of 0.05–10% by weight.

The benzotriazole-based polymerizable unsaturated double bond-containing ultraviolet absorber (G) is not particularly restricted so long as it has a double bond. The ultraviolet absorber includes, for example, (meth) acryloylated benzotriazole-based ultraviolet absorbers such as 2-(2'-hydroxy-5'-acryloxyethylphenyl)-2H-benzotriazole, 2-(2'-hydroxy-5'-methacryloxyethylphenyl)-2H-benzotriazole and the like. Such a polymerizable benzotriazole-based ultraviolet-absorptive compound is conducive to a coating which is highly curable, stably storable and capable of prolonging good weathering resistance. Also desirably, this compound serves to protect the associated primer and substrate (to prevent the substrate from becoming faded or deteriorated by the action of light).

These polymerizable unsaturated double bond-containing benzotriazole-based ultraviolet absorbers may be used alone, or two or more ultraviolet absorbers may be used in admixture. It is desired that simultaneously with production of the acrylic resin (A), the ultraviolet absorber be so copolymerized as to incorporate as a component in such resin. This ensures that good weathering resistance is prolonged, providing good curing of the resultant coating and good weathering of the finished film in a well-balanced state.

From the standpoints of good storage stability and curing of the coating, a light-stabilizing compound (HALS) of 8 or more in basicity constant (PKb) is added in an amount of 0.05–10 parts by weight based on 100 parts by weight of the acrylic resin (A) so that weathering resistance can further be improved. As examples of the light-stabilizing compound (hereinafter referred to shortly as HALS), there are illustrated copolymerizable piperidine-containing light-stabilizing compounds such as 1,2,2,6,6-pentamethyl-4-piperidyl methacrylate and the like. These monomers may be used singly, or two or more monomers may be used in admixture.

The light-stabilizing compound acts to rapidly improve the weatherability of the finished film without producing adverse effects on the storage stability of and curing of the resulting composition. HALS is effective particularly in an enamel coating formulated with a pigment such as titanium dioxide, carbon black, aluminum or the like so that weathering is obtainable at an extremely high level. Namely, the finished film is highly retentive of gloss and greatly resistant to irregular toning.

Specific examples of HALS having a PKb of 8 or more include 1-{2-(3-(3,5-di-t-butylhydroxyphenyl) propionyloxy)ethyl}-4-{3-(3,5-di-t-butyl-4-hydroxyphenyl) propionyloxy}-1-2,2,6,6-tetramethyl piperidine, 8-acetyl-3-dodecyl-7,7,9,9-tetramethyl-1,3,8-triazaspiro{4,5}decane-2,4-dione and the like. These compounds may be used alone, or two or more compounds may be used in combination.

The above compound is added in an amount of 0.05–10 parts by weight, preferably 0.5–5 parts by weight, based on 100 parts by weight of the acrylic resin (A). Smaller amounts than 0.05 part by weight are not effective in improving weather resistance, whereas larger amounts than 10 parts by weight sometimes reveal a slight decline in the curing and storage stability of the resultant coating.

Where desired, there may also be copolymerized or formulated hydrolyzable alkoxy silane group-containing unsaturated monomers such as 3-methacryloyloxypropyl trimethoxysilane, 3-methacryloyloxypropyl dimethoxysilane, 3-methacryloyloxypropyl triethoxysilane, 3-methacryloyloxypropyl diethoxysilane, 3-acryloyloxypropyl trimethoxysilane, 3-acryloyloxypropyl dimethoxysilane, 3-acryloyloxypropyl triethoxysilane, 3-acryloyloxypropyl diethoxysilane and the like, and hydrolyzable alkoxysilane group-containing chain transfer agents (regulators of polymerization degrees) such as 3-mercaptopropyl trimethoxysilane, 3-mercaptopropylmethyl dimethoxysilane, 3-mercaptopropyl triethoxysilane, 3-mercaptopropylmethyl diethoxysilane and the like. These monomers or chain transfer agents may be used alone, or two or more monomers or agents may be used in combination.

The acrylic resin (A) is usually derivable in the form of a solvent solution, an aqueous dispersion or the like by means of radical copolymerization in common use. Preferably, in the practice of the present invention, the acrylic resin can be produced by solution polymerization of a hydroxyl group-containing unsaturated monomer, an alicyclic epoxy group-containing unsaturated monomer and another copolymerizable unsaturated monomer, at a polymerization temperature of 40–150° C., in an organic solvent such as toluene, xylene, butyl acetate, ethyl acetate, isopropyl alcohol, n-butyl alcohol, ethylene glycol monobutyl ether, propylene glycol monomethyl ether, cyclohexane or the like and in the presence of an organic azo-based polymerization initiator such as α,α'-azobis isobutylonitrile, α,α'-azobis valeronitrile and the like, or a polymerization initiator such as benzoyl peroxide, t-butylperoxy-2-ethyl hexanoate or the like.

The number-average molecular weight (Mn) of the acrylic resin (A) is preferably in the range of 2000–80000, more preferably 2500–50000, as measured from GPC of the resin and in terms of polystyrene. As is well known, the molecular weight may be adjusted by adding a chain transfer agent such as n-dodecyl mercaptan or the like when the acrylic resin is produced. Smaller number-average molecular weights than 2000 make the resultant composition somewhat less curable at low temperature with eventual shrinkage of the finished film. Larger number-average molecular weights than 80000 give a film with low gloss and unsatisfactory appearance. However, these problems are not deemed true when the resulting resin composition is used as a primer.

Examples of the alicyclic epoxy resin (B) of 100–1000 in epoxy equivalent weight are disclosed in "13197 Chemical Products", p. 923–931, Kagaku Kogyo Nippo Co. (1997). Such epoxy resin is chosen, among others, from 3,4-epoxycyclohexyl methyl-3,4-epoxycyclohexyl carboxylate, and compounds represented by the following formulae 1–5, each of which is configured to have an alicyclic epoxy group in the molecule. These compounds may be used alone, or two or more compounds may be used together.

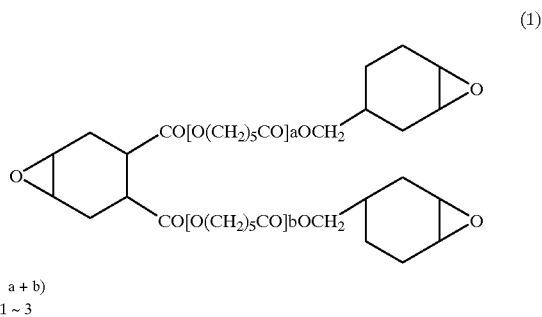

(1)

(n = a + b)
n = 1 ~ 3

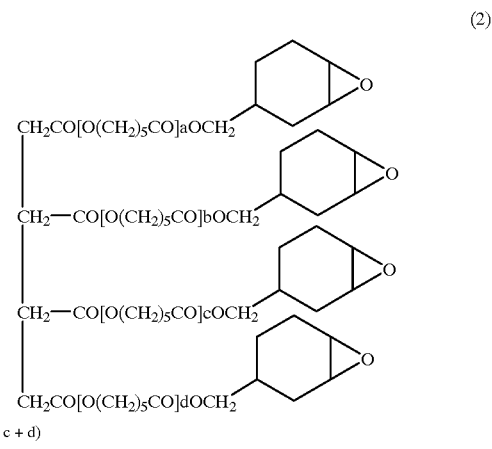

(2)

(n = a + b + c + d)
n = 1 ~ 3

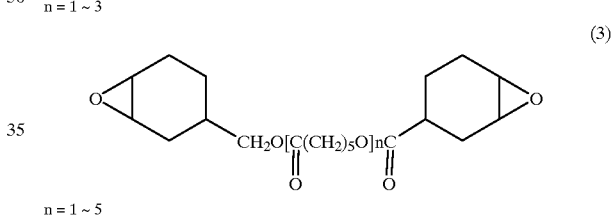

(3)

n = 1 ~ 5

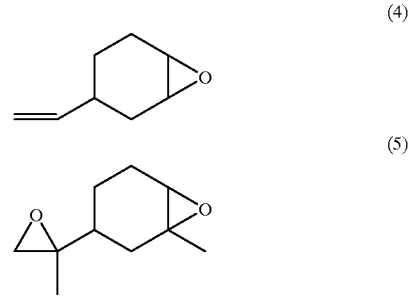

(4)

(5)

Less epoxy equivalent weights than 100 in the epoxy resin (B) make the resultant composition sufficiently curable at low temperature, but the finished film becomes hard and brittle with deficient resistance to impact and to flex. More epoxy equivalent weights than 1000 delay curing slightly so that the film causes delayed rise in initial hardness and hence becomes somewhat less resistant to initial mar and to gasoline.

The alicyclic epoxy resin (B) is added to the acrylic resin (A) in a weight ratio of A/B=60/40–99/1, preferably 70/30–98/2, more preferably 85/15–98/2. In case the alicyclic epoxy resin (B) is used in a ratio of less than 1, curing is inadequate at low temperature with consequent slight reduction in water resistance and weather resistance. More ratios than 40 make the finished film more likely to shrink and less glossy.

The organoalkoxy silane compound (C) having a glycidyl group and a hydrolyzable alkoxy silane group in one molecule includes γ-glycidoxypropyl trimethoxysilane, γ-glycidoxypropyl triethoxysilane, γ-glycidoxypropyl triisopropoxysilane, γ-glycidoxypropylmethy diethoxysilane, β-(3,4-epoxycyclohexyl) ethyl dimethoxysilane and the like. These compounds may be used alone, or two or more compounds may be used in admixture. Hydrolyzates or partial condensates of the compounds are also useful.

The silane compound is reactive individually or with the alicyclic epoxy and hydroxyl groups attached to the side chains of the acrylic resin (A) and with the alicyclic epoxy resin (B) and is capable of imparting a crosslinked structure to the finished film. To attain good curing at low temperature, the silane compound should necessarily have both a glycidyl group and a hydrolyzable alkoxy silane group (or a silanol group). Absence of either one of these functional groups makes it difficult to obtain curing at low temperature. For example, in the case where a hydrolyzable alkoxy silane compound devoid of a glycidyl group, such as phenyl trimethoxysilane, is used in place of the above-specified silane compound, a curing reaction does not take place sufficiently at a low temperature of 80° C. or below, resulting in reduced film properties such as water resistance, chemical resistance, gasoline resistance, weather resistance and the like.

The organoalkoxy silane compound (C) is added to the sum of the acrylic resin (A) and the alicyclic epoxy resin (B) in a weight ratio of (A+B)/C=50/50–95/5, preferably 55/45–90/10. Less ratios than 5 slightly adversely affects curing at low temperature. In the case of more ratios than 50, the resultant coating fails to bond sufficiently when re-coating to repair a defective portion of the finished film.

The composition according to the present invention is constituted essentially of an acrylic resin having a hydroxyl group and an alicyclic epoxy group attached to side chains thereof, an alicyclic epoxy resin, and an organoalkoxy silane compound having a glycidyl group and a hydrolyzable alkoxy silane group contained in one molecule thereof. To be more specific, all of the film-forming components should desirably have an epoxy group (a glycidyl group). Thus, this composition produces superior curing performance at low temperature (the resultant coating cures sufficiently even at a curing temperature of 80° C. or below, giving various superior properties of the finished film), superior storage stability (the coating is stable even after prolonged storage (in closed condition) with a sufficiently long pot life (in open condition)), and superior touch-up performance (when being subjected to something defective as by dust, the applied film is sanded or re-coated as it is; also called re-coating bonding). Moreover, since both the acrylic resin and the epoxy resin have an alicyclic epoxy group, the composition is greatly effective for protection from acid rain that has recently been tackled as a serious and important issue in the fields of coatings and paintings, and for anticorrosion of aluminum, iron and the like. The glycidyl group-containing silane compound cooperates with the acrylic and epoxy resins in achieving superior adhesion (bonding) to a wide variety of substrates irrespective of their organic or inorganic source of supply. The performance characteristics stated above, therefore, are rendered more conspicuous.

In other words, the composition of the present invention has made a drastic change in the concept of conventional coatings, finding a large number of applications in spite of a single coating. For its high stability and possible curing at low temperature, this composition contributes greatly to resource savings and energy savings.

Namely, these superior performance characteristics are attributed to the acrylic resin having a hydroxyl group and an alicyclic epoxy group attached to the side chains, the alicyclic epoxy resin, and the organoalkoxy silane compound having a glycidyl group and a hydrolyzable alkoxy silane group contained in one molecule, all of which have been organically formulated as film-forming components.

The aluminum chelate compound (D) includes aluminum ethyl acetoacetate diisopropirate, aluminum tris(ethyl acetoacetate), aluminum tris(acetylacetate), aluminum bisethyl acetoacetate monoacetyl acetonate and the like. The aluminum chelate compound acts as a catalyst and a crosslinking agent when the acrylic resin, the alicyclic epoxy resin and the organoalkoxy silane compound react with each other to form a crosslinked film. The above aluminum chelate compounds may be used alone, or two or more compounds may be used in admixture.

The aluminum chelate compound (D) is used with respect to the acrylic resin (A), the alicyclic epoxy resin (B) and the organoalkoxy silane compound (C) in a weight ratio of (A+B+C)/D=100/0.5–100/5, preferably 100/1–100/4. Less ratios than 0.5 cause poor curing at low temperature, requiring long periods of time to attain sufficient film properties. More ratios than 5% by weight result in reduced storage stability and weather resistance.

It is well known that a proper chelating agent is added as a stabilizer to prevent a coating from becoming accidentally functional during storage. A chelating agent is suitably useful also in the present invention; desirably, acetylacetone, diacetone alcohol, acetomethyl acetate, acetoethyl acetate or the like is added to improve storage stability.

No particular restriction is imposed upon the method for producing the composition of the present invention in case the acrylic resin (A), the alicyclic epoxy resin (B) of 100–1000 in epoxy equivalent weight, the organoalkoxy silane compound (C) and the aluminum chelate compound (D) can be brought into homogeneous mixture with each other. One form of the method is described for illustrative purposes.

Into a container equipped with a stirrer are charged an acrylic resin (A) and an alicyclic epoxy resin (B) of a specific structural formula, and the resins are stirred. An aluminum chelate compound (D) is then put little by little into the resin mixture, followed by dissolution of the whole. Finally, an organoalkoxy silane compound (C) is added to the solution which is continuously stirred until a homogeneous composition is obtained. Though heating may be performed where needed at the process steps, the composition can be satisfactorily produced even at room temperature. In order to ensure stable production (to prevent gelled matter that would appear as the curing reaction proceeds), temperatures of 20–50° C. are preferred.

To produce a coating more stably, an acrylic resin (A) and an alicyclic epoxy resin (B) are charged, stirred and mixed uniformly, and an organoalkoxy silane compound (C) is then put into the mixture. Mixing is conducted until a homogeneous mixture is obtained. After the resulting composition is prepared into a coating (production of a coating), an aluminum chelate compound (D) can be finally added. In this instance, the aluminum chelate compound (D) may be dissolved in advance in an organic solvent such as toluene, xylene or the like and in a chelate stabilizer such as acetylacetone or the like. This facilitates much convenience and stable production.

In another method, particularly in the production of an enamel coating (a colored coating in which pigment has been formulated and dispersed), a mixed solution of an acrylic resin (A) and an alicyclic epoxy resin (B) is prepared in which a pigment is then dispersed. The resultant enamel coating (mill base (pigment paste)) is let down (diluted to an appropriate coating viscosity and to a proper pigment content) by a composition prepared in advance and constituted of an acrylic resin (A), an alicyclic epoxy resin (B) and an organoalkoxy silane compound (C) or by only the organoalkoxy silane compound (C). Finally, an aluminum chelate compound (or the foregoing diluted solution) is added and mixed until a homogeneous coating is obtained.

The composition of the present invention can be used, for base coat (a base coating) or top coat (a top coating), as it is or after being prepared into a coating, i.e., after being mixed when desired with pigments such as titanium dioxide, carbon black, aluminum paste and the like, well-known coating additives (leveling agents, pigment dispersants, suspending agents, additive-type ultraviolet absorbers in common use other than the unsaturated double bond-containing benzotriazole-based ultraviolet absorber according to the present invention, light stabilizers (HALS) of 8 or below in basicity constant (PKb), defoamers and the like) and diluting solvents. This composition can also be used in combination with an acrylic urethane resin coating, an urethane resin coating, an alkyd resin coating, an epoxy resin coating, a fluorine resin coating, a silicone resin coating, an acrylic silicone resin coating or the like (reference: "13197 Chemical Products", Kagaku Kogyo Nippo Co. (published in 1997)). For example, the coating produced from the composition of the present invention may be applied for base coat on which the acrylic urethane resin coating is put to use.

Substrates used for coating of the composition of the present invention include plastic materials such as ABS (acrylonitrile-butadiene-styrene resin), polystyrene, polycarbonate, nylon and the like, metallic materials such as iron, aluminum, galvanized steel, tin and the like, these metallic materials subjected to chemical treatment, these metallic materials derived from cationic or anionic electrodeposition coating, and construction materials such as mortar, cement, asbestos-filled cement, asbestos-filled cement perlite, brick, clay tile and the like.

Coating methods are chosen from among spray coating, brush coating, roll coating, coating with use of a roll coater, curtain coating, anionic electrodeposition coating, cationic electrodeposition coating and the like that are commonly practiced in an industrial sector in which use is made of the coating produced from the composition of the present invention.

Coated articles are widely applicable. For example, they can be used for plastic parts and metallic materials in automobiles and bicycles (from a small scale to a large scale), for plastic parts and metallic materials in household appliances, exterior walls (sizing boards, curtain walls and aluminum sashes), roof tiles, and glass or plastic cosmetic supplies (containers, brushes and the like).

EXAMPLES

The present invention will be described hereinbelow and in greater detail by way of examples. All parts are indicated by weight parts and all composition ratios by weight percentages unless otherwise noted.
[Evaluation Methods]
A. Film Appearance and Sharpness
1. Formation of Coated Plates for Testing In each coating resin composition an aluminum pigment, Alpaste 7680 NS (product of Toyo Aluminum Co., ltd.), was compound such that the weight PWC of the pigment was set to be 7%.

$$PWC(\%) = \frac{\text{pigment amount}(g)}{\text{pigment amount}(g) + \text{resin component}(g)} \times 100$$

The mixture was sufficiently mixed in a dispersing mixer and then diluted by a mixed solvent of toluene/methylpropylene glycol/isopropanol (=50/30/20) (coating A) to have a coating viscosity of 15 seconds as measured with Ford Cup #4. This coating was applied in a film thickness of 20 μm on to a plate formed of an acrylonitrile-butadiene-styrene resin (coated plate 1).

Each coating resin composition was diluted by a mixed solvent of toluene/methylpropylene glycol/isopropanol (=50/30/20) (coating B) to have a coating viscosity of 15 seconds as measured with Ford Cup #4. This coating was applied in a film thickness of 30 μm on to the coated plate 1 obtained above, and the resulting plate was then baked at 80° C. for 20 minutes and then dried to produce coated plate 2 for testing use.
2. Tests and Evaluations
    (1) Film Appearance In coated plate 1 and coated plate 2, film appearance 1 was coated in an atmosphere of 15° C. and 25% RH, film appearance 2 of 25° C. and 50% RH and film appearance 3 of 30° C. and 70% RH.

Each film was judged for its uniformity and shrinkage.
 ○ Film was uniform with no shrinkage; acceptable.
 Δ Film was uniform but with slight shrinkage at an edge portion; unacceptable.
 x Film shrunk as a whole: unacceptable.
    (2) Sharpness In coated plate 1 and coated plate 2, coating was performed in an atmosphere of 25° C. and 50% RH.

The sharpness of each film was measured by the use of a portable glossmeter, PGD-IV (No. 88568) (manufactured by Nippon Color Research Foundation and Tokyo Photoelectric Co., Ltd.). The higher the sharpness is as the numerical value was higher. Larger than 0.8 has been determined to be acceptable.
B. Bonding Performance
1. Production of Coated Plates for Testing, Tests and Evaluations A. Coating A used for the tests of film appearance and sharpness was applied in a film thickness of 20 μm on to an ABS plate (ABS), followed by application of coating B in a film thickness 30 μm of to the resultant film.

Coating was likewise performed on an A-6063 aluminum plate (AL), a bonderized steel plate (BD) and a glass plate (GR). After being dried at 23° C. for 10 minutes, each coated plate was baked at 75° C. for 20 minutes.

The bonding performance of each coated plate was checked in accordance with the squaring method stipulated by JIS K 5400 (8.5.1) (published by the Japan Standards Association in 1997). 100/100 has been determined to be acceptable (○). Other marks are unacceptable.
C. Rust Proofness
1. Production of Coated Plates for Testing, Tests and Evaluations A. Coating A used for the tests of film appearance and, sharpness was applied in a film thickness of 20 μm on to a bonderized steel plate, followed by application of coating B in a film thickness of 30 μm to the resultant film. This coated plate was baked at 75° C. for 20 minutes to produce a coated plate for testing use. The film was notched crisscross of and diagonally of the bonderized plate from end to end. An aqueous salt solution-spraying test was performed according to JIS K 5400 (9.1) (published by the Japan Standards Association in 1997). After a lapse of 240 hours, inspection was made of whether and how rust had occurred at or around the notched portions.

○ Neither rust nor blister appeared; acceptable.

Δ Rust occurred at the notched portions but with no blister; acceptable.

x Rust grew in a wide area from the notched portions; unacceptable.

(Reference Examples)

In the examples to follow, acrylic resins (A), epoxy resins (B), organoalkoxy silane compounds (C) and an aluminum chelate (D) were used, details of which were described below.

Acrylic Resins (A)

(1) Acrylic Resin (1)

Acrylic resin (1) (=solid content 60%, Mn 18000, hydroxyl value 43 mg KOH and epoxy equivalent weight 1306) was obtained by solution polymerization of a monomeric mixture of methyl methacrylate (MMA)/n-butyl methacrylate (BMA)/n-butyl acrylate (BA)/3,4-epoxycyclohexylmethyl acrylate (EPCA)/2-hydroxyethyl methacrylate (HEMA and Tg=40° C.) (=28/24/23/15/10), at a polymerization temperature of 93° C., in a solvent of toluene (TOL)/propyleneglycolmethyl ether (PM) (=60/40) and in the presence of a polymerization initiator of α,α'-azobisisobutylonitrile (ABN).

(2) Acrylic Resin (2)

Acrylic resin (2) (=solid content 60%, Mn 18000, hydroxyl value 39 mg KOH and epoxy equivalent weight 1306) was obtained by solution polymerization of a monomeric mixture of MMA/BMA/BA/EPCA/4-hydroxybutyl acrylate (4HB and Tg=−80° C.) (=28/24/23/15/10), at a polymerization temperature of 93° C., in a solvent of TOL/PM (=60/40) and in the presence of a polymerization initiator of ABN.

(3) Acrylic Resin (3)

An acrylic resin (=solid content 60%, Mn 12000, hydroxyl value 39 mg KOH and epoxy equivalent weight 1306) was obtained by solution polymerization of a monomeric mixture of MMA/BMA/BA/EPCA/4HB (=28/24/23/15/10), at a polymerization temperature of 93° C., in a solvent of TOL/PM (=60/40) and in the presence of a polymerization initiator of ABN. This resin was further formulated with 8-acetyl-3-5-dodecyl-7,7,9,9'-tetramethyl-1,3,8-triazaspiro{4,5}decane-2,4-dione (HALS (PKb 12) with a PKb of 8 or more; "SANOL LS-440", product of Sankyo Co., Ltd.) such that the solid content of the latter compound was set to be 2%, whereby acrylic resin (3) was produced.

(4) Acrylic Resin (4)

Acrylic resin (4) (=solid content 60%, Mn 35000, hydroxyl value 39 mg KOH and epoxy equivalent weight 1960) was obtained by solution polymerization of a monomeric mixture of MMA/BMA/BA/EPCA/4HB (=28/26/26/10/10), at a polymerization temperature of 93° C., in a solvent of TOL/PM (=60/40) and in the presence of a polymerization initiator of ABN.

(5) Acrylic Resin (5)

Acrylic resin (5) (=solid content 60%, Mn 15000, hydroxyl value 39 mg KOH and epoxy equivalent weight 1420) was obtained by solution polymerization of a monomeric mixture of MMA/BMA/BA/EPCA/4HB/2-(2'-hydroxy-5'-methacryloxyethyl phenyl)-2 H-benzotriazole (a polymerizable double bond-containing ultraviolet absorber, "RUVA-93" manufactured by Ohtsuka Chemical Co., Ltd.) (=28/26/24/10/10/2), at a polymerization temperature of 93° C., in a solvent of TOL/PM (=60/40) and in the presence of a polymerization initiator of ABN.

(6) Acrylic Resin (6)

Acrylic resin (6) (=solid content 60%, Mn 15000, hydroxyl value 86 mg KOH and epoxy equivalent weight 1420) was obtained by solution polymerization of a monomeric mixture of MMA/BMA/BA/glycidyl methacrylate (GMA)/HEMA (=28/21/21/10/20), at a polymerization temperature of 93° C., in a solvent of TOL/PM (=60/40) and in the presence of a polymerization initiator of ABN.

(7) Acrylic Resin (7)

Acrylic resin (7) (=solid content 60%, Mn 30000 and hydroxyl value 86 mg KOH) was obtained by solution polymerization of a monomeric mixture of MMA/BMA/BA/HEMA (=28/26/26/20), at a polymerization temperature of 93° C., in a solvent of TOL/PM (=60/40) and in the presence of a polymerization initiator of ABN.

Epoxy Resins (B)

(1) 3,4-Epoxycyclohexylmethyl-3,4-epoxycyclohexyl carboxylate; epoxy equivalent weight 175–190; "ERL-4221" manufactured by Union Carbide Co.

(2) Bisphenol A epoxy resin (epoxy equivalent weight 180–200); "EP-4100" manufactured by Asahi Denka Industries Co., Ltd.

Organoalkoxy Silane Compounds (C)

(1) 3-Glycideoxypropyl trimethoxysilane (GMP); "S-510" manufactured by Chisso Co., Ltd.

(2) Illustrative form of the production of a hydrolyzate (GMP-H) of a silane compound In a 1-liter 4-necked flask equipped with a stirrer and a condenser were put 28 g of deionized water (conductivity 0.5 μs/cm) and 390 g of 3-glycidoxypropyl trimethoxysilene, and the whole was stirred. Hydrochloric acid of 1 mol/liter was then added dropwise in an amount of 28 g over 3 hours while the temperature was being held at 10° C. Reaction was continued with stirring at 10° C. for 2 hours.

Thus, a hydrolyzate was prepared from the silane compound.

Aluminum Chelate (D)

(1) Aluminum tris(acetylacetate); "Alumichelate A (W)" manufactured by Kawaken Fine Chemicals Co. Ltd.

Examples 1–5 and Comparative Examples 1–4

With the formulations shown in Table 1, selected starting materials were charged in a stainless beaker and stirred at room temperature until a homogeneous mixture was obtained. Thus, coating resin compositions were produced for use in the examples and comparative examples.

These compositions were tested as set above with the results shown in Table 1.

As is evidenced by Table 1, superior curing can be attained even during baking at low temperature when the composition of the present invention is used which is constituted of an acrylic resin structured to have a hydroxyl group and an alicyclic epoxy group attached to the side chains, an alicyclic epoxy resin and a glycidyl group-containing silane compound. The finished film is sharp and aesthetic without shrinkage even when it is derivable in various coating atmospheres, and besides, is highly bondable and anticorrosive as essentially necessary for coatings. Thus, an almost complete coating system can be achieved with a coating and a film provided in a well-balanced state in different coating atmospheres and in various applications.

TABLE 1

Examples and Comparative Examples

|  |  | Examples | | | | | Comparative Examples | | | |
| --- | --- | --- | --- | --- | --- | --- | --- | --- | --- | --- |
|  |  | 1 | 2 | 3 | 4 | 5 | 1 | 2 | 3 | 4 |
| Acrylic | 1 | 166.7 | | | | | | | | |
| resin | 2 | | 166.7 | | | | | 166.7 | | |
|  | 3 | | | 166.7 | | | | | | |
|  | 4 | | | | 166.7 | | | | | |
|  | 5 | | | | | 166.7 | | | | |
|  | 6 | | | | | | 166.7 | | 166.7 | |
|  | 7 | | | | | | | | 166.7 | |
| Epoxy | | 5.3 | 5.3 | 5.3 | 5.3 | 5.3 | 5.3 | 33.3 | | |
| Bis A | | | | | | | | | | 5.3 |
| GMP | | 56.7 | 56.7 | | 56.7 | | | | | 56.7 |
| GMP-H | | | | 56.7 | | 56.7 | | | | |
| Silane | | | | | | | | 57.3 | 42.9 | |
| AL | | | | | | | | 38.1 | 28.6 | |

Epoxy: 3,4-epoxycyclohexylmethyl-3,4-epoxycyclohexyl carboxylate
Bis A: bisphenol A epoxy resin (epoxy equivalent weight 180)
GMP: 3-glycidoxypropyl trimethoxysilane
Silane: triphenylsilanol
AL: mixed solution of aluminum tris(acetylacetate)/TOL/acetylacetone = 10/50/40

TABLE 2

Test Results

|  |  | Examples | | | | | Comparative Examples | | | |
| --- | --- | --- | --- | --- | --- | --- | --- | --- | --- | --- |
|  |  | 1 | 2 | 3 | 4 | 5 | 1 | 2 | 3 | 4 |
| Film | 1 | o | o | o | o | o | X | X | Δ | x |
| appearance | 2 | o | o | o | o | o | o | o | o | A |
|  | 3 | o | o | o | o | o | Δ | X | Δ | X |
| Sharpness | | 0.8 | 1.2 | 1.6 | 0.8 | 1.5 | 0.5 | 0.6 | 0.5 | 0.3 |
| Bonding | ABS | o | o | o | o | o | o | X | o | X |
|  | AL | o | o | o | o | o | X | X | X | X |
|  | BD | o | o | o | o | o | o | X | o | X |
|  | GR | o | o | o | o | o | X | X | X | X |
| Anticorrosion | | Δ | o | o | o | o | X | Δ | X | X |

Examples 6 and 7

Each of the compositions obtained in Examples 3, 4 and 5 and Comparative Examples 1, 2 and 3 was further diluted by a solvent of toluene/butyl acetate/propyleneglycol monomethyl ether (=50/30/20) such that the viscosity was set at 15 seconds as measured with Ford Cup #4, followed by application in a film thickness of 50 μm on a propylene plate (PP) and an A-6063 aluminum plate (AL). Each such plate was baked at a selected temperature for 20 minutes and then dried, after which it was tested in respect of gel fraction and weather resistance.

D. Relationship Between Baking Temperatures and Gel Fractions (Example 6)

The film was peeled off from the PP plate and cut into small pieces of 10×30 mm. They were placed in a Soxhlet extractor of a 10-piece capacity and extracted with refluxing for 3 hours.

The gel fraction (%) was calculated from the following formula.

$$\text{gel fraction} = \frac{\text{weight of dry film having remained after } \textit{Soxhlet} \text{ extraction test}}{\text{weight of film before } \textit{Soxhlet} \text{ extraction test}} \times 100 \quad \text{formula 1}$$

The higher the curing and crosslinking of film are as the numerical value of gel fraction is higher.

Higher gel fractions than 80% are acceptable. The results thus obtained are shown in FIG. 1.

As is clear from the results of FIG. 1, the composition of the present invention has been found to be highly curable even at a baking temperature of lower than 80° C., particularly lower than 75° C., and hence adequately practical.

E. Relationship Between Baking Temperatures and Weather Resistances (Example 7)

The film formed on the AL plate was set in place on a QUV accelerated weathering tester (an accelerated weathering tester of Q-Panel Co.) and exposed to accelerated weathering for 2000 hours. The gloss retention (%) after testing was examined from which weatherability was determined to be acceptable or unacceptable.

The QUV test conditions were set to be one cycle with temperature 60° C., irradiation 8 hours×50° C. and condensation 4 hours. The results thus obtained are shown in FIG. 2.

Figure 2:
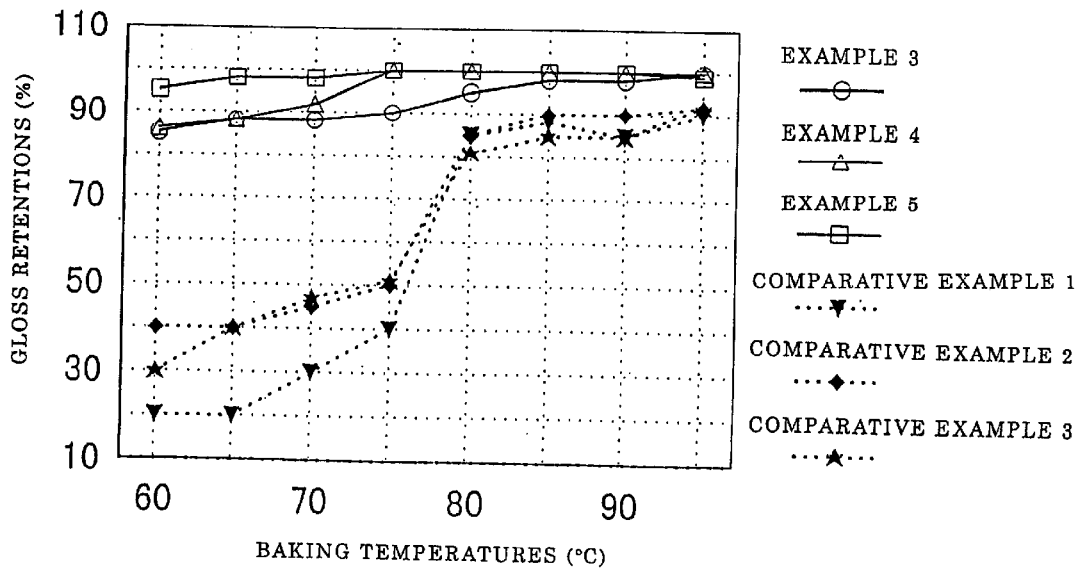
FIG. 2 shows the results obtained in Example 7.

As is apparent from the results of FIG. 2, the composition of the present invention has been found to be highly weatherable even at a baking temperature of lower than 80° C., particularly lower than 75° C. This is due to the fact that this composition is sufficiently high in gel fraction even at a baking temperature of lower than 80° C., and therefore, the film is crosslinkable enough to maintain high weatherability.

Industrial Applicability

The present invention provides a coating resin composition which is stably storable, highly curable at low temperature (80° C. or below) suitable for application to substrates such as plastic materials and the like which are less resistant to heat, and capable of producing a highly weatherable coating. In particular, a coating resin composition of a one-pack type and a coating derivable therefrom are provided. Moreover, this composition exhibits various superior coating performance characteristics (bonding, appearance, weathering resistance, chemical resistance, solvent resistance and the like) in a well-balanced manner.

What is claimed is:

1. A coating resin composition comprising an acrylic resin (A) having a hydroxyl group and an alicyclic epoxy group attached to side chains thereof, an alicyclic epoxy resin (B) having an epoxy equivalent weight of 100–1000, an organoalkoxy silane compound (C) having a glycidyl group and a hydrolyzable alkoxy silane group contained in one molecule thereof, and an aluminum chelate compound (D).

2. The coating resin composition according to claim 1, wherein the acrylic resin (A), the alicyclic epoxy resin (B), the organoalkoxy silane compound (C) and the aluminum chelate compound (D) are mixed to meet with the following formulae by weight, (1) A/B=60/40–99/1,
(2) (A+B)/C=50/50–95/5, and
(3) (A+B+C)/D=100/0.5–100/5.0.

3. The coating resin composition according to one of claims 1 and 2, wherein a polymerizable unsaturated double bond-containing benzotriazole-based ultraviolet absorber has been copolymerized in an amount of 0.05–10% by weight in the acrylic resin (A) based on the weight of the acrylic resin (A).

4. The coating resin composition according to claim 1, wherein a light-stabilizing compound is mixed in an amount of 0.05–10 parts by weight based on 100 parts by weight of the acrylic resin (A), the compound having a basicity constant (PKb) of 8 or more.

* * * * *

UNITED STATES PATENT AND TRADEMARK OFFICE
CERTIFICATE OF CORRECTION

PATENT NO. : 6,274,671 B1
DATED : August 14, 2001
INVENTOR(S) : Ichiji Kageishi, Yoshitaka Osanai and Yumi Ando It is certified that error appears in the above-identified patent and that said Letters Patent is hereby corrected as shown below:

<u>Column 13,</u>
Table 1, in Row 2 under the heading "Comparative Examples", please move "166.7" from Column 2 to Column 3, and in Row 6 under the heading "Comparative Examples", please move "166.7" from Column 3 to Column 4.

Signed and Sealed this

Thirtieth Day of July, 2002

Attest:

Attesting Officer

JAMES E. ROGAN
*Director of the United States Patent and Trademark Office*